US008644678B2

(12) United States Patent
Smith et al.

(10) Patent No.: US 8,644,678 B2
(45) Date of Patent: Feb. 4, 2014

(54) VIDEO RECORDING MANAGEMENT

(75) Inventors: Donald E. Smith, Lexington, MA (US);
James H. Drew, Sugar Hill, NH (US);
Raymond Sweha, Boston, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 162 days.

(21) Appl. No.: 13/150,931

(22) Filed: Jun. 1, 2011

(65) Prior Publication Data

US 2012/0224835 A1    Sep. 6, 2012

Related U.S. Application Data

(60) Provisional application No. 61/448,991, filed on Mar. 3, 2011.

(51) Int. Cl.
*H04N 5/92* (2006.01)

(52) U.S. Cl.
USPC .......................................... 386/248; 386/239

(58) Field of Classification Search
None
See application file for complete search history.

(56) References Cited

U.S. PATENT DOCUMENTS

| | | | | |
|---|---|---|---|---|
| 2002/0077984 | A1* | 6/2002 | Ireton | 705/51 |
| 2008/0263146 | A1* | 10/2008 | Habuto et al. | 709/203 |
| 2010/0306808 | A1* | 12/2010 | Neumeier et al. | 725/105 |
| 2010/0332567 | A1* | 12/2010 | Samadani | 707/912 |
| 2010/0333148 | A1* | 12/2010 | Musha et al. | 725/81 |
| 2011/0213655 | A1* | 9/2011 | Henkin et al. | 705/14.49 |
| 2011/0265113 | A1* | 10/2011 | Apfel et al. | 725/32 |
| 2012/0230655 | A1* | 9/2012 | Potrebic et al. | 386/297 |

OTHER PUBLICATIONS

D. R. Cox. Regression models and Life-Tables. *Journal of the Royal Statistical Society. Series B (Methodological)*, 34(2): 187-220, 1972.
Kyoungwon Suh, C. Neumann, D. Towsley, and M. Varello. Push-to-Peer Video-on-Demand system: Design and evaluation. *IEEE Journal on Selected Areas in Communications*, 25(9): 1706-1716, Dec. 2007.
Laoutaris et al., "ECHOS: Edge Capacity Hosting Overlays of Nano Data Centers", ACM SIGCOMM Computer Communication Review, vol. 38, No. 1, Jan. 2008, pp. 51-54.
Cook et al., "Empiric Comparison of Multivariate Analytic Techniques: Advantages and Disadvantages of Recursive Partitioning Analysis", Journal of Chronic Diseases, vol. 37, No. 9/10, Mar. 2, 1984, pp. 721-731.

* cited by examiner

*Primary Examiner* — Huy T Nguyen
*Assistant Examiner* — Eileen Adams

(57) ABSTRACT

A device may estimate a probability that each video recording, of a group of video recordings, will be played back at the device during a time interval. The group of video recordings may include video recordings stored locally at the device and video recording stored at a remote location. The device may also determine whether to transfer a video recording to the remote location or retrieve a video recording from the remote location based on the estimated probabilities.

19 Claims, 13 Drawing Sheets

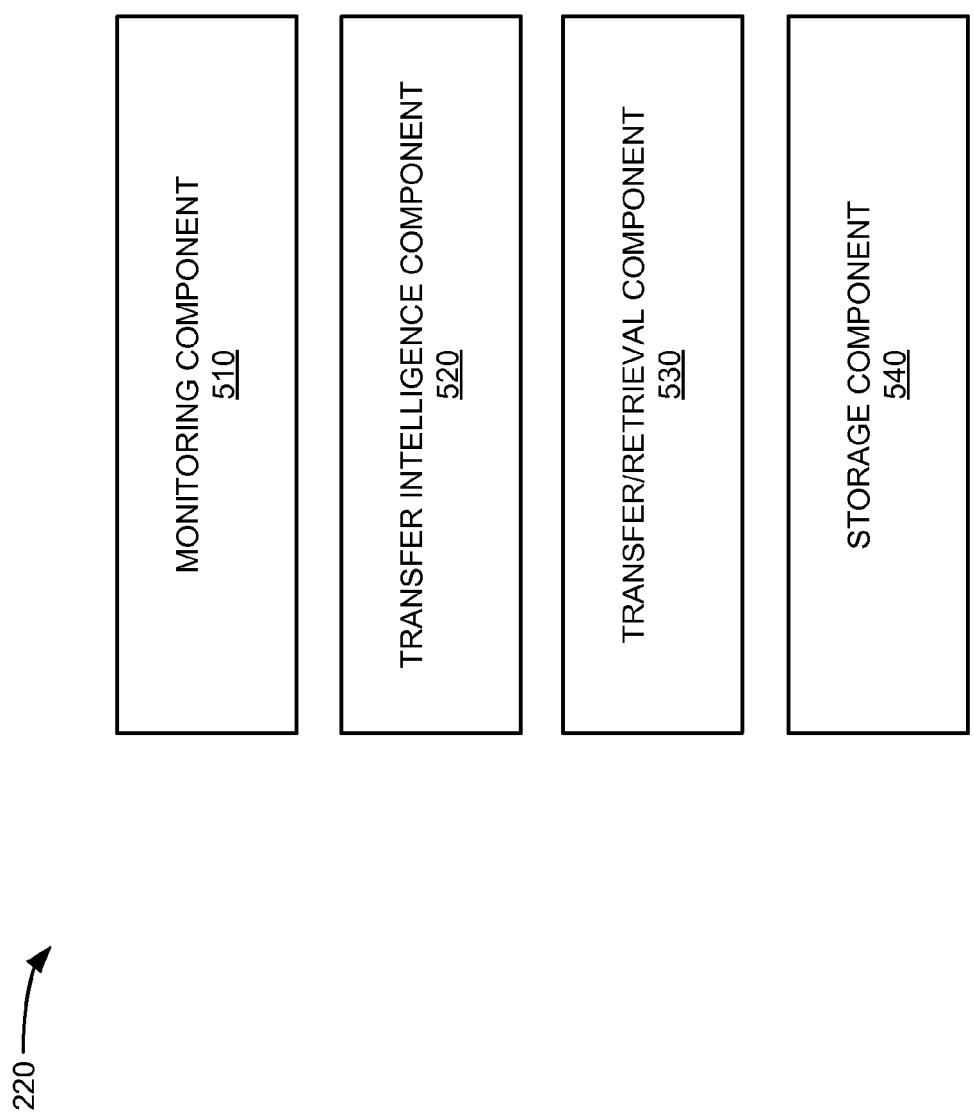

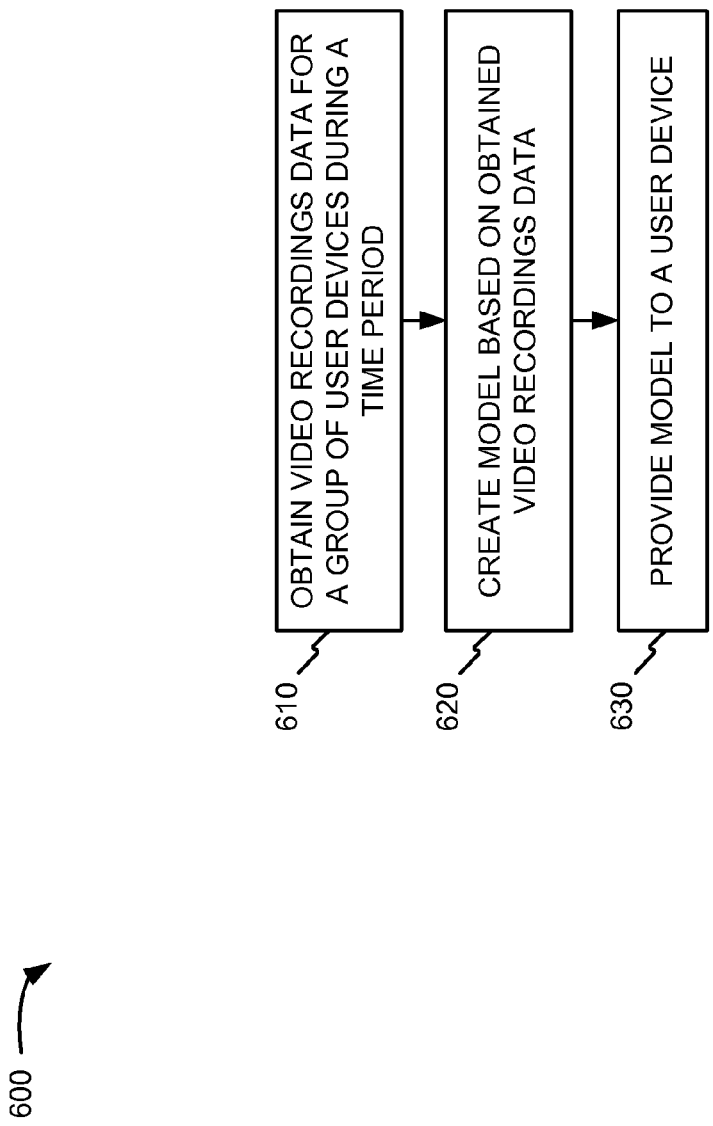

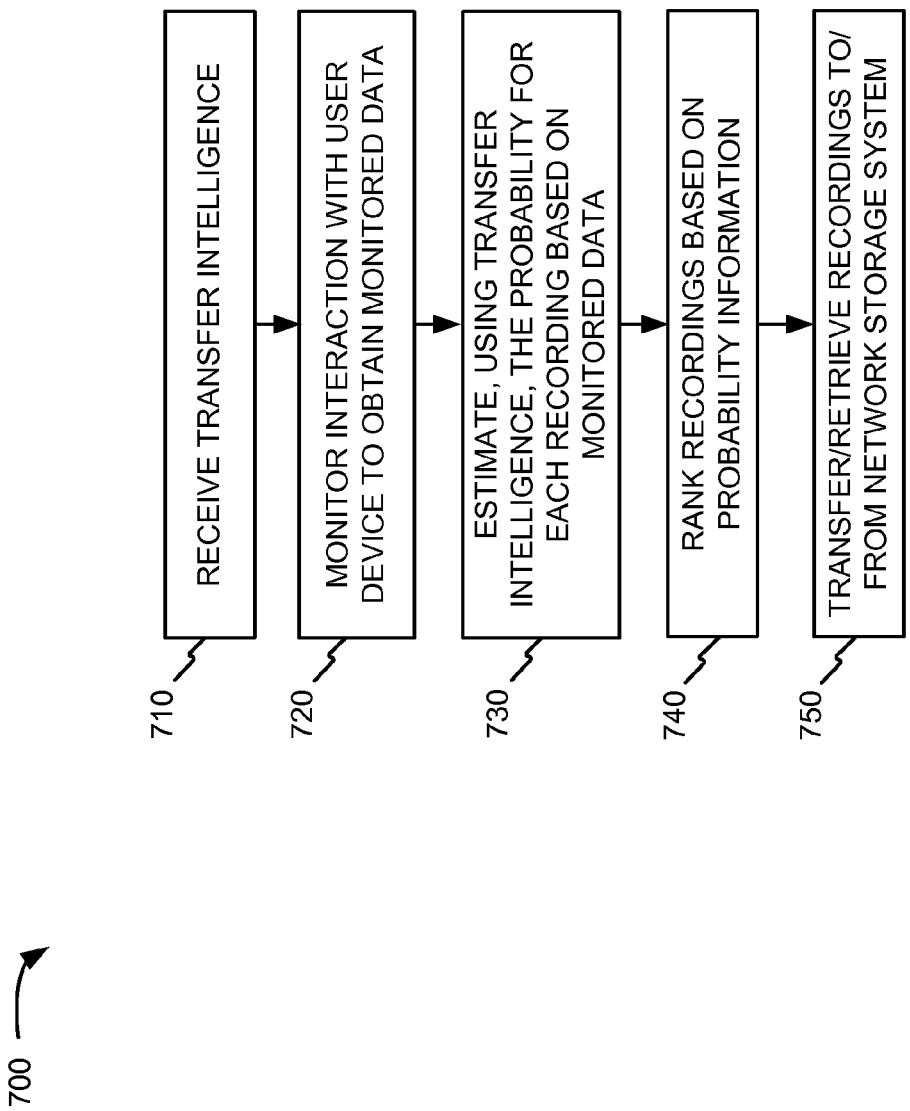

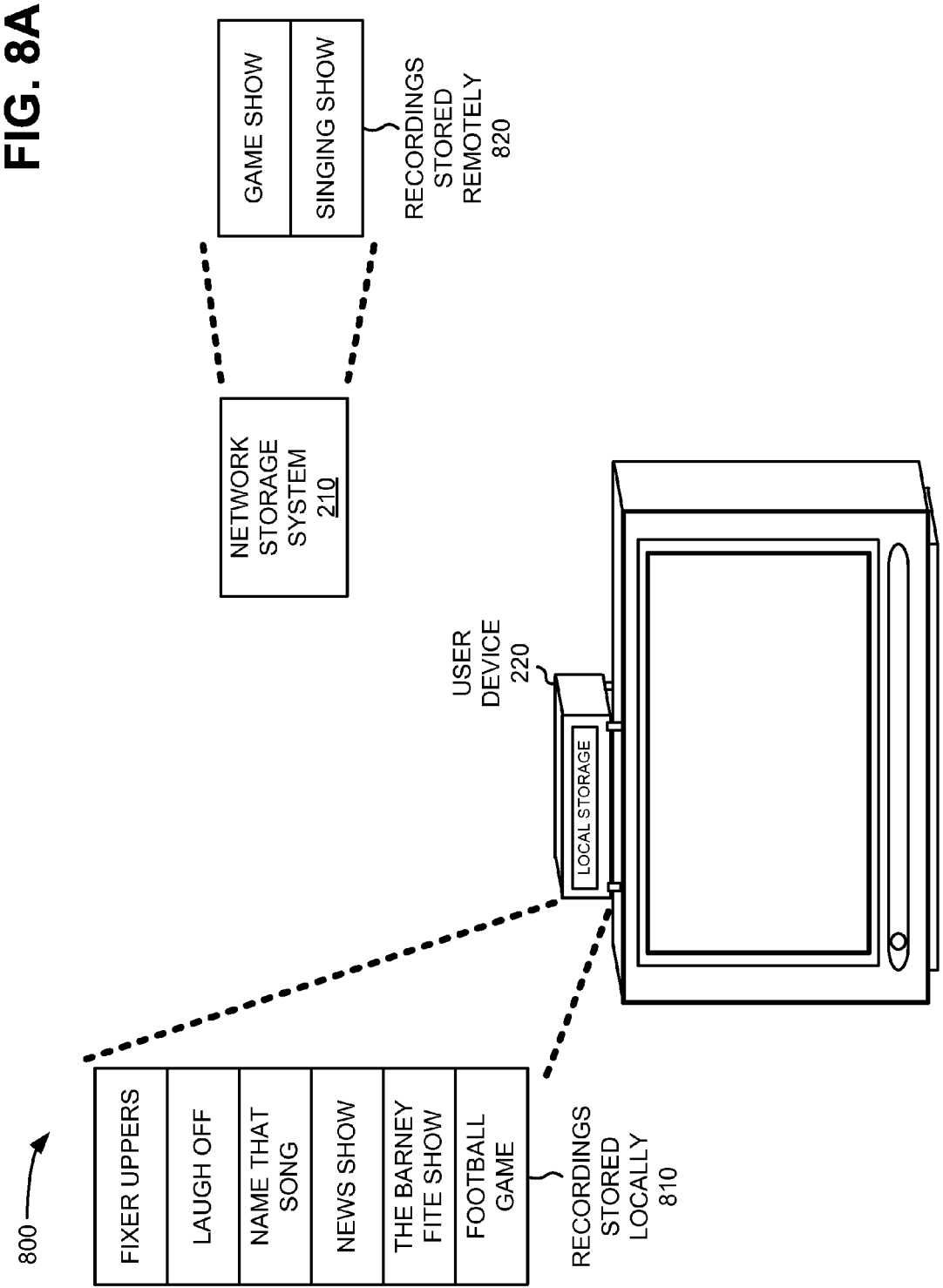

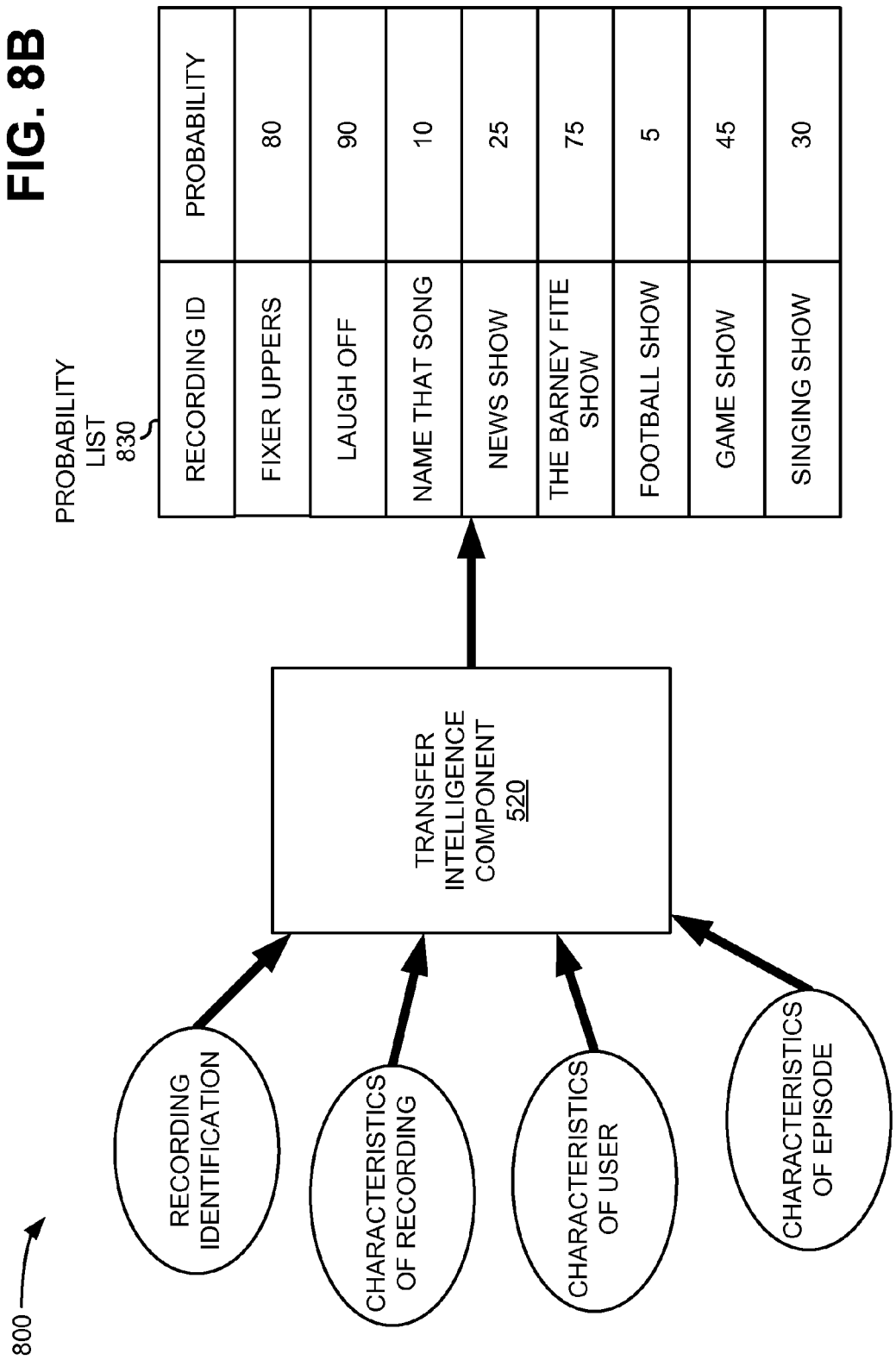

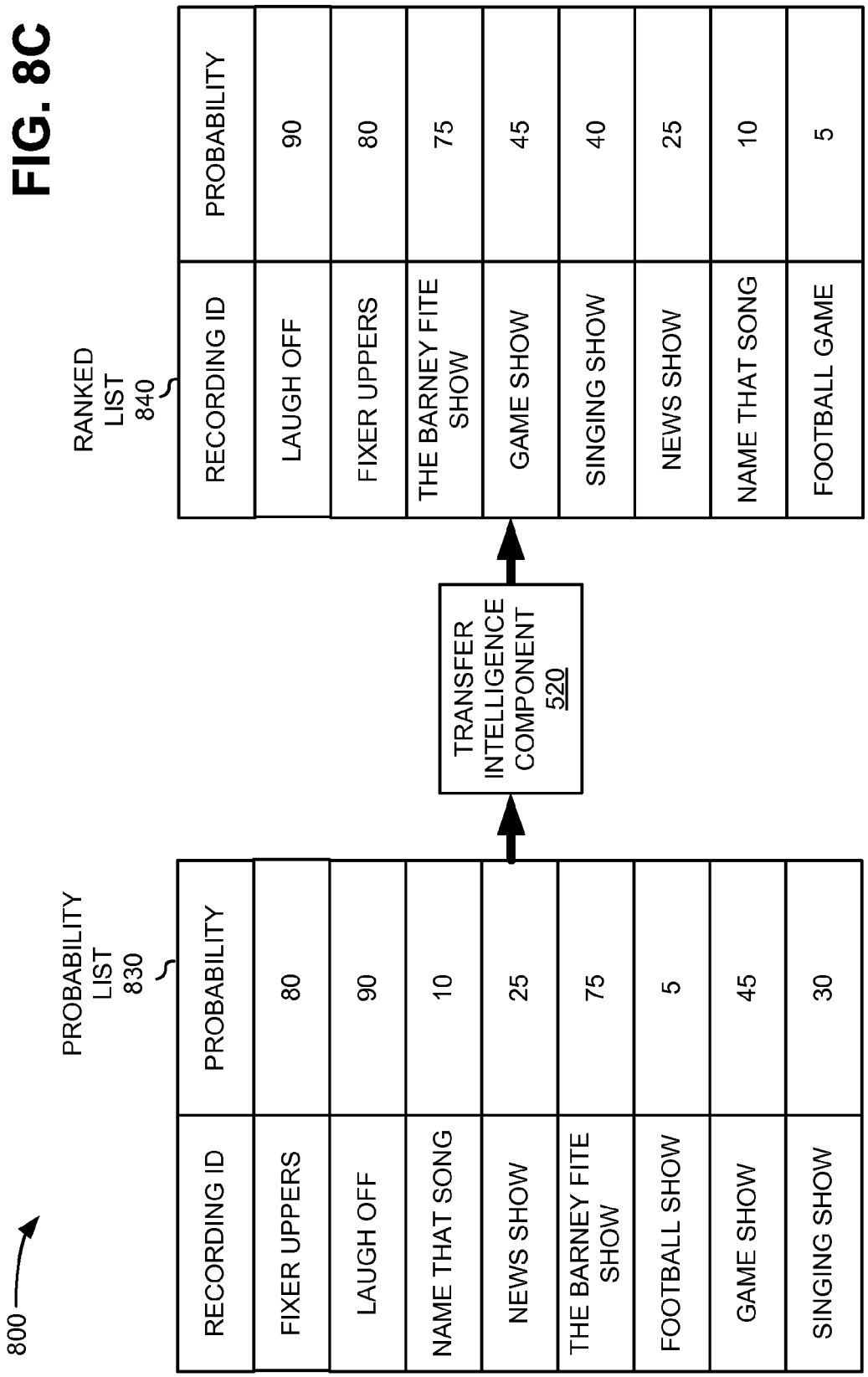

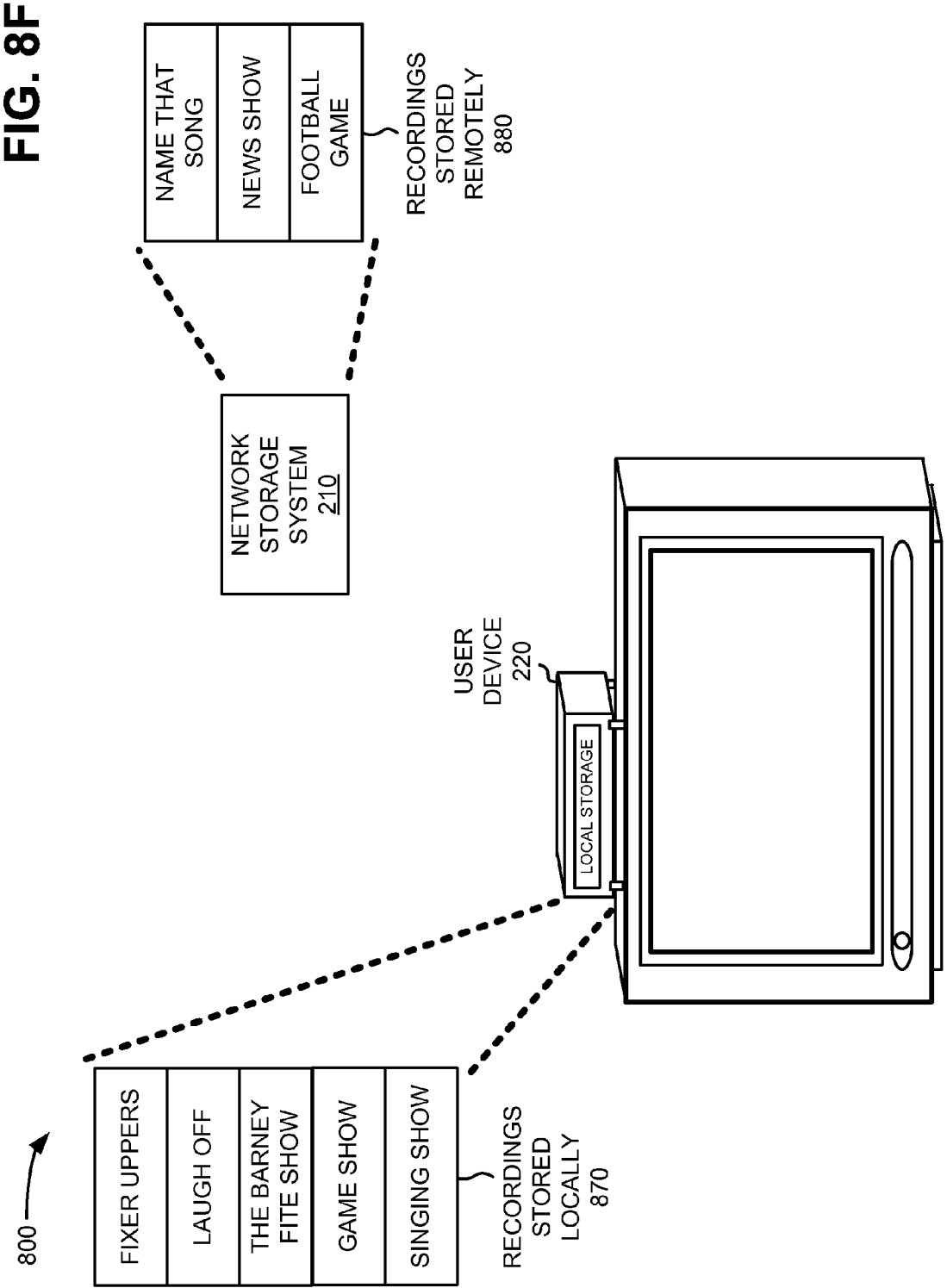

VIDEO RECORDING MANAGEMENT

RELATED APPLICATION

This application claims priority to U.S. Provisional Patent Application No. 61/448,991, filed Mar. 3, 2011, the disclosure of which is incorporated herein by reference.

BACKGROUND INFORMATION

Television distribution systems, such as fiber optic networks, cable networks, and satellite networks, provide users with a large number of television programs. Users often record television programs on storage devices, such as digital video recorders. Due to the limited storage capacity of those storage devices, users are often required to delete recordings to make room for new recordings.

BRIEF DESCRIPTION OF THE DRAWINGS

FIG. 5 is a diagram of example functional components of a portion of the user device of FIG. 2;

FIG. 6 is a flow chart of an example process for providing transfer intelligence to a user device;

FIG. 7 is a flow chart of an example process for transferring/retrieving video recordings to/from a network storage system; and FIGS. 8A-8F provide an example of the processing described above with respect to FIG. 7.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Figure 1:
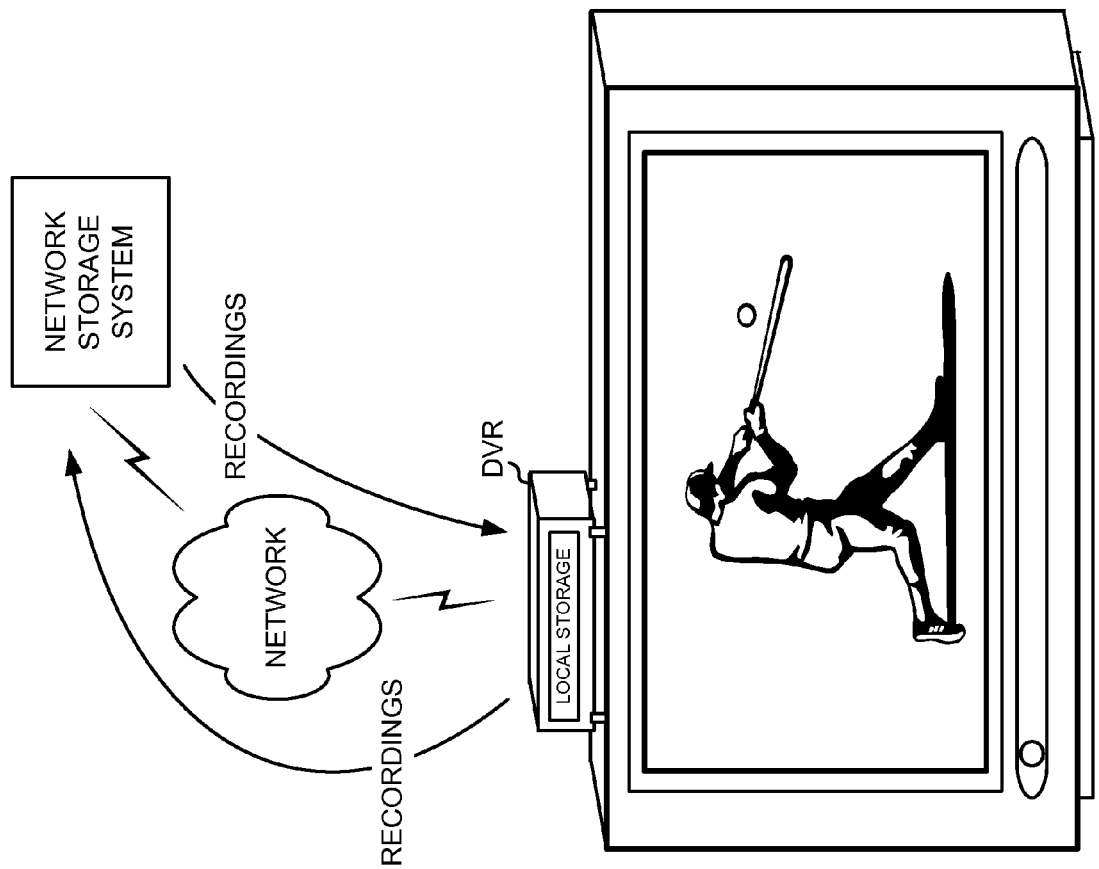
FIG. 1 is an example of a concept described herein.

FIG. 1 is an example of a concept 100 described herein. To increase the number of video recordings available to a user through the user's digital video recorder (DVR), implementations described herein may store the user's video recordings locally on the digital video recorder and remotely in a network storage system. The digital video recorder and/or the network storage system may include intelligence for determining the likelihood, in a given time period, that the user will watch each stored video recording. Those video recordings with the highest probabilities of being watched during the time period may be stored on the digital video recorder and those video recordings with the lowest probabilities of being watched during the time period may be stored at the network storage system. Thus, the digital video recorder may transfer, at some interval, those video recordings with low probabilities to the network storage system. Additionally, or alternatively, the digital video recorder may retrieve, from the network storage system, those video recordings with high probabilities that are stored at the network storage system. In this way, the number of times that the digital video recorder has to retrieve a video recording from the network storage system, during periods of high network usage, may be reduced.

Figure 2:
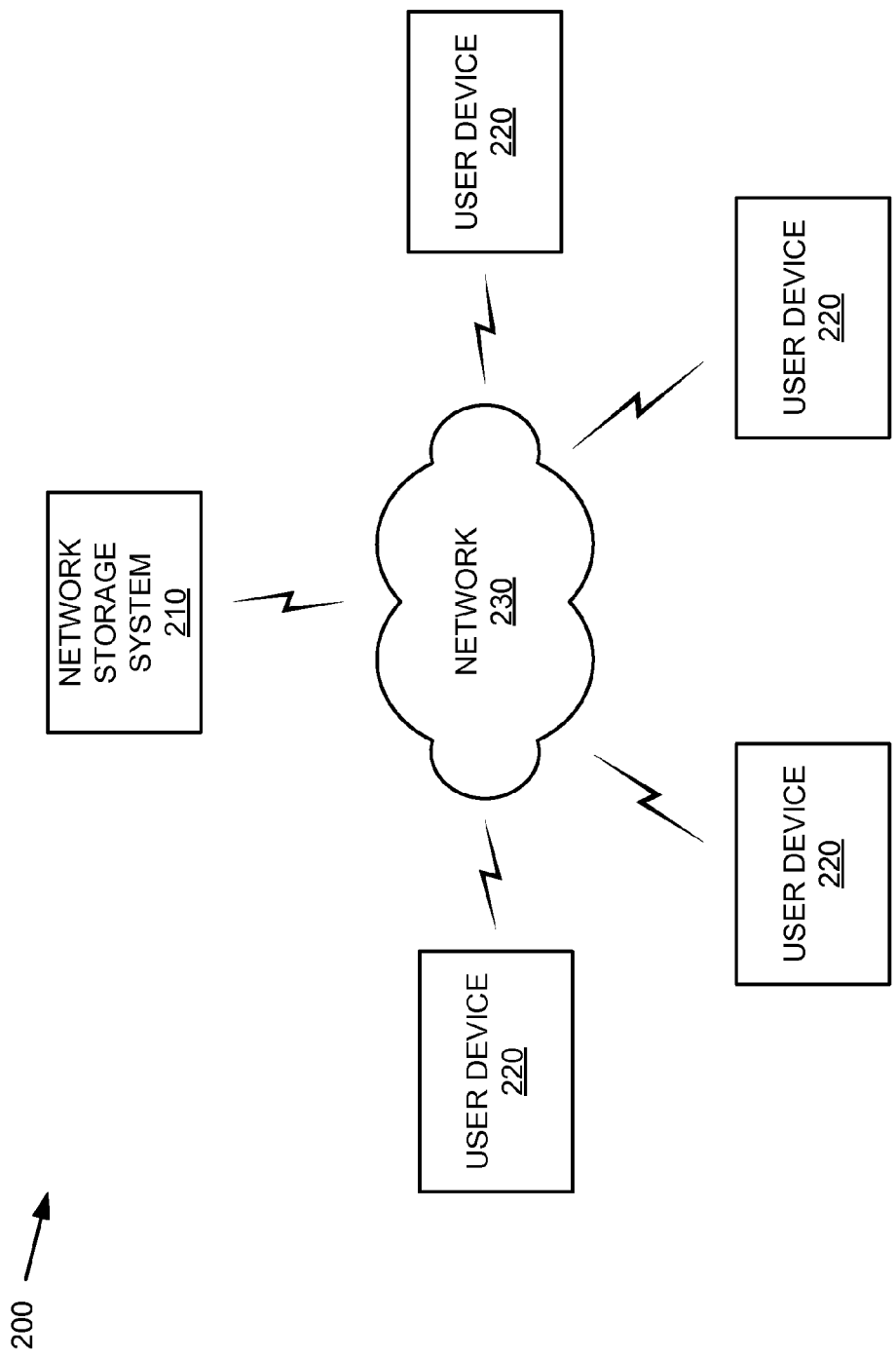
FIG. 2 is an example network in which systems and/or methods described herein may be implemented.

FIG. 2 is an example network 200 in which systems and/or methods described herein may be implemented. As illustrated, network 200 may include a network storage system 210, a group of user devices 220 (referred to collectively as "user devices 220" and, in some instances, individually as "user device 220"), and a network 230.

Network storage system 210 may include one or more devices that store video recordings and send the video recordings to one or more user devices 220. In some implementations, network storage system 210 may transfer video recordings to a particular user device 220 in response to a request from the particular user device 220. Network storage system 210 may connect to network 230 via wired and/or wireless connections.

User devices 220 may include one or more devices that are capable of receiving and storing video recordings and providing the video recordings to a display, such as a television. For example, user devices 220 may include digital video recorders, set top boxes with storage capabilities, gaming systems, and/or other types of devices. User devices 220 may connect to network 230 via wired and/or wireless connections.

Network 230 may include one or more networks of any type, including a television network (such as a cable television network or a fiber optic television network), a wireless network, a Public Switched Telephone Network (PSTN), a local area network (LAN), a metropolitan area network (MAN), a wide area network (WAN), a private network, the Internet, an intranet, and/or another type of network.

Although FIG. 2 shows example components of network 200, in other implementations, network 200 may include fewer components, different components, differently arranged components, or additional components than depicted in FIG. 2. Additionally, or alternatively, one or more components of network 200 may perform the tasks described as being performed by one or more other components of network 200.

Figure 3:
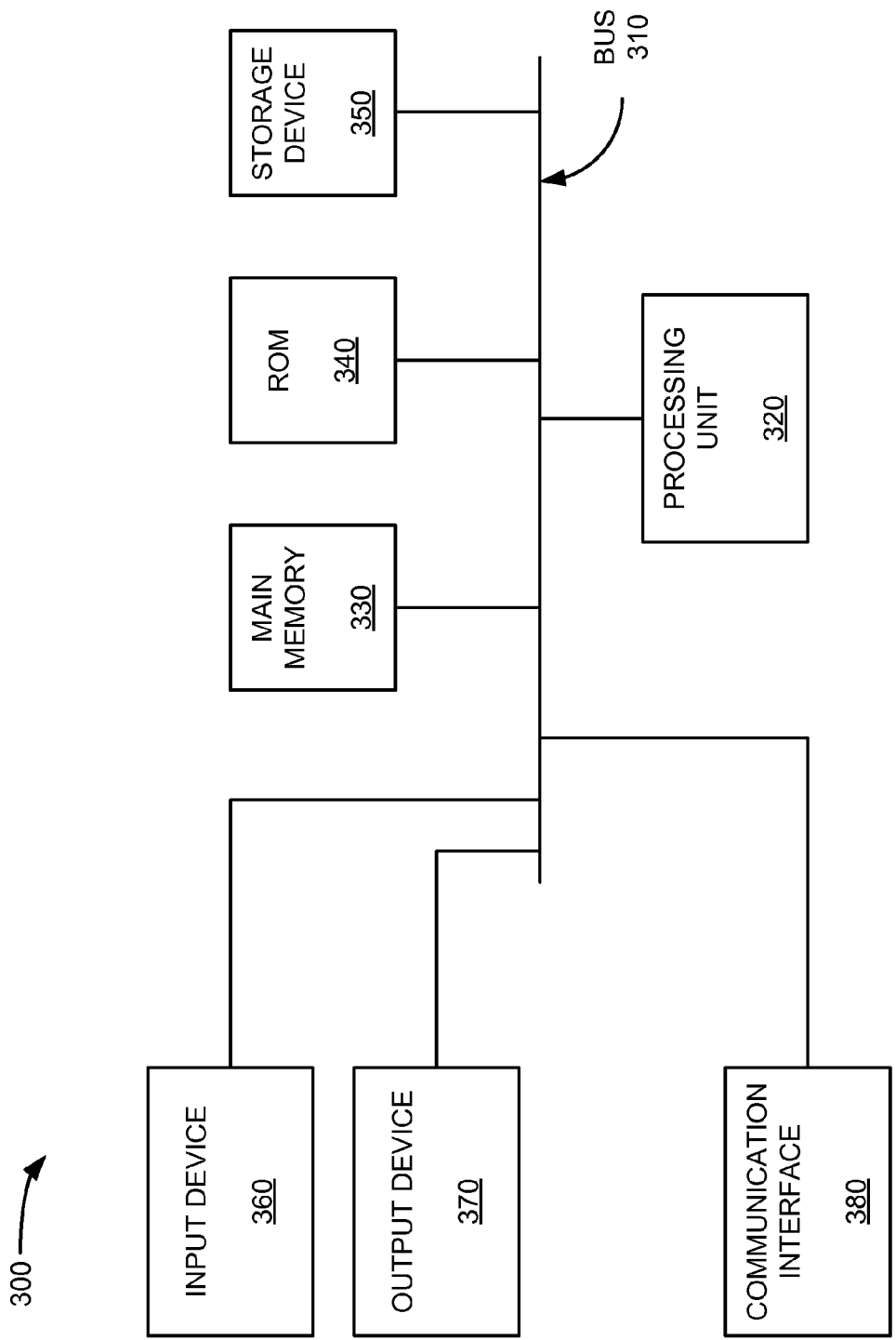
FIG. 3 is a diagram of example components of an entity.

FIG. 3 is a diagram of example components of an entity 300. Entity 300 may correspond to or be included within network storage system 210 and/or user device 220. As shown in FIG. 3, entity 300 may include a bus 310, a processing unit 320, a main memory 330, a read only memory (ROM) 340, a storage device 350, an input device 360, an output device 370, and a communications interface 380.

Bus 310 may permit communication among the components of entity 300. Processing unit 320 may include one or more processors and/or microprocessors that interpret and execute instructions. In some implementations, processing unit 320 may be implemented as or include an application specific integrated circuit (ASIC), field programmable gate array (FPGA), or the like. Main memory 330 may include a random access memory (RAM) or another type of dynamic storage device that stores information and instructions for execution by processing unit 320. ROM 340 may include a ROM device and/or another type of static storage device that stores static information and instructions for the processing unit 320. Storage device 350 may include a magnetic or optical recording medium and its corresponding drive for storing information and/or instructions.

Input device 360 may include a device that permits an operator to input information to entity 300, such as a button, a keyboard, a keypad, a mouse, a pen, a microphone, one or more biometric mechanisms, and the like. Output device 370 may include a device that outputs information to the operator, including a display, a speaker, etc.

Communication interface 380 may include any transceiver-like mechanism that enables entity 300 to communicate with other devices and/or systems. For example, communication interface 380 may include mechanisms for communicating with another device or system via a network, such as network 230.

As will be described in detail below, entity 300 may perform certain operations in response to processing unit 320 executing software instructions of an application contained in a computer-readable medium, such as memory 330. A computer-readable medium may be defined as a non-transitory memory device. A memory device may include a space within a single physical memory device or spread across multiple physical memory devices.

The software instructions may be read into memory 330 from another computer-readable medium or from another device via communication interface 380. The software instructions contained in memory 330 may cause processing unit 320 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 3 illustrates example components of entity 300, in some implementations, entity 300 may include fewer components, different components, differently arranged components, or additional components than those depicted in FIG. 3. Additionally, or alternatively, one or more components of entity 300 may perform one or more tasks described as being performed by one or more other components of entity 300.

Figure 4:
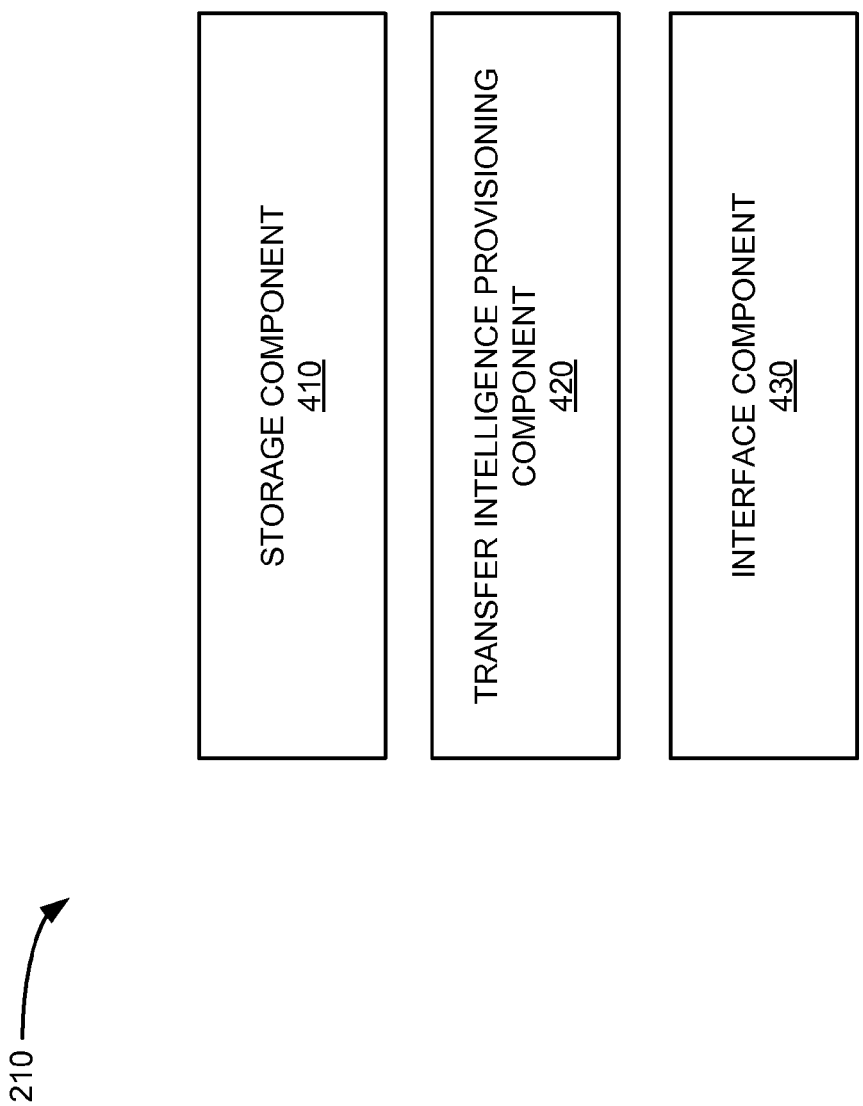
FIG. 4 is a diagram of example functional components of a portion of the network storage system of FIG. 2.

FIG. 4 is a diagram of example functional components of a portion of network storage system 210. In one implementation, the functional components described in connection with FIG. 4 may be implemented via, for example, processing unit 320 executing instructions contained in memory 330. As illustrated, network storage component 210 may include a storage component 410, a transfer intelligence provisioning component 420, and an interface component 430.

Storage component 410 may include one or more components that store video recordings. For example, storage component 410 may receive video recordings from user devices 220 and store the video recordings. In some implementations, storage component 410 may store, with each video recording, information identifying the particular user device 220 from which the video recording was received. Additionally, or alternatively, storage component 410 may store, with each video recording, information identifying a user with which the video recording is associated (e.g., the user who recorded the video recording). Storage component 410 may store the video recordings in a compressed format.

Transfer intelligence provisioning component 420 may include one or more components that provide, to user devices 220, information that aid user devices 220 in deciding which video recordings are to be transferred to and retrieved from network storage component 210. For example, transfer intelligence provisioning component 420 may generate and provide a model that may be used by user devices 220 to make video recording transfer/retrieval decisions. In one implementation, transfer intelligence provisioning component 420 may generate the model based on a set of video recordings data that includes information relating to videos that are recorded and later played back for a group of user devices 220. Further information regarding the generation of the model is provided below with respect to FIG. 6.

Interface component 430 may include one or more components that provide video recordings to user devices 220. In one implementation, interface component 430 may receive a request for a particular video recording from a user device 220, retrieve the video recording from storage component 410, and provide the video recording to user device 220. In some implementations, interface component 430 may authenticate user device 220 and/or a user associated with user device 220, in response to receiving the request.

In addition, interface component 430 may receive video recordings from user devices 220 and store the video recordings in storage component 410. In some implementations, interface component 430 may associate, with video recording stored in storage component 410, information identifying the particular user device 220, from which the video recording was received, or a user of the particular user device 220.

Although FIG. 4 illustrates example functional components of network storage component 210, in other implementations, network storage component 210 may include fewer functional components, different functional components, differently arranged functional components, or additional functional components than those depicted in FIG. 4. Additionally, or alternatively, one or more functional components of network storage component 210 may perform one or more tasks described as being performed by one or more other functional components of network storage component 210.

FIG. 5 is a diagram of example functional components of a portion of user device 220. In one implementation, the functional components described in connection with FIG. 5 may be implemented via, for example, processing unit 320 executing instructions contained in memory 330. As illustrated, user device 220 may include a monitoring component 510, a transfer intelligence component 520, a transfer/retrieval component 530, and a storage component 540.

Monitoring component 510 may include one or more components that track information relating to video recordings associated with user device 220 and/or information relating to a user associated with user device 220. For example, monitoring component 510 may track whether each video recording has been played back, the amount of time that each video recording has been available from user device 220 (e.g., the amount of time since the videos were recorded), the amount of time between when the video was recorded and when the video was played back, and/or other information relating to the video recordings. Additionally, or alternatively, monitoring component 510 may track characteristics of the television series of which a particular video recording is a part, in those situations that the particular video recording is part of a television series. For example, monitoring component 510 may track, for a particular video recording of a particular television series, the number of previous episodes, of that television series that have been recorded and played back by user device 220. Additionally, or alternatively, monitoring component 510 may monitor characteristics associated with the user of user device 220. For example, monitoring component 510 may monitor the user's viewing habits (e.g., does the user tend to watch recorded videos at particular times (such as during the evenings), how many recorded videos does the user tend to watch during a particular viewing period (e.g., the user tends to watch two recorded videos in the evenings), etc.).

Transfer intelligence component 520 may include one or more components that determine which video recordings are to be transferred to and retrieved from network storage system 210. For example, transfer intelligence component 520 may receive the tracked information, from monitoring component 510, and a model (or an algorithm), from transfer intelligence provisioning component 420, and use the tracked information and the model to make video recording transfer/retrieval decisions. As an example, transfer intelligence component 520 may maintain a list of video recordings available at user device 220 and network storage system 210, and estimate, for each video recording in the list and using the model and the tracked information, a probability that the video recording will be watched during a time period (e.g., on a given day). Transfer intelligence component 520 may then rank the video recordings based on the estimated probabilities and make transfer/retrieval decisions based on the rankings In some implementations, transfer intelligence component 520 may additionally make video recording transfer/retrieval decisions based on the physical or designated storage capacity of storage component 540.

Transfer intelligence component 520 may additionally, or alternatively, make video recording transfer/retrieval decisions based on one or more algorithms. Examples of algorithms that may be used by transfer intelligence component 520 may include:

- A Never Played (NP) algorithm, which may cause user device 220 to be filled with a selected group of video recordings, such as a randomly selected group, that have never been played. If additional space exists in user device 220, the NP algorithm may fill user device 220 with already played video recordings at random. The NP algorithm may cause any remaining video recordings to be sent back to network storage system 210.
- A Least Recently Recorded (LRR) algorithm, which may cause user device 220 to make video recording transfer/retrieval decisions based on a probability that is inversely proportional to the age of the video recording. Thus, based on this algorithm, user device 220 may cause video recordings to be stored at network storage system 210 in the reverse order of the time since the video was recorded, with the oldest video recording be transferred to network storage system 210 first.
- A Least Recently Used (LRU) algorithm, which may cause user device 220 to make video recording transfer/retrieval decisions based on a probability that is inversely proportional to the time since the time that the video was recorded or since the most recent playback of the video recording, whichever is latest.
- An algorithm based on NP and LRR, which may cause user device 220 to initially sort video recordings based on whether or not the video recording was watched, and then sort the video recordings based on the least recently recorded algorithm described above.
- An algorithm based on NP and LRU, which may cause user device 220 to initially sort video recordings by whether or not the video recording was watched, and then by the least recently used algorithm described above.

Other algorithms may alternatively be used.

Transfer intelligence component 520 may make transfer/retrieval decisions at periodic or non-periodic time intervals or in response to an event, such as a command from a user. The time intervals may correspond to a daily basis, a semi-daily basis, or some other time interval. Transfer intelligence component 520 may also make transfer/retrieval decisions in response to an event or a network state. For example, transfer intelligence component 520 may make transfer/retrieval decisions when daily network traffic is lowest. For example, transfer intelligence component 520 may make transfer/retrieval decisions during off hours, such as between 2 AM and 5 AM. The periodic time interval and the particular time, within the periodic time interval, may be configurable by the user of user device 220.

Transfer/retrieval component 530 may include one or more components that transfer video recordings to network storage system 210 and retrieve video recordings from network storage system 210. In one implementation, transfer component 530 may receive, from transfer intelligence component 520, information identifying particular video recordings that are to be transferred to and/or retrieved from network storage system 210. In response to receiving that information, transfer component 530 may, for example, send particular video recordings from user device 220 to network storage system 210 and/or send a request for particular video recordings to network storage system 210 (e.g., to interface component 430). In some implementations, transfer/retrieval component 530 may convert the video recordings to a compressed format prior to sending the video recordings to network storage system 210. In addition, transfer component 530 may convert video recordings, received from network storage system 210, into an uncompressed format. In one implementation, transfer component 530 may send authentication information to network storage system 210.

Storage component 540 may include one or more components that store video recordings. For example, storage component 540 may store videos that have been recorded by user device 220. Additionally, storage component 540 may store video recordings received from network storage system 210.

Although FIG. 5 illustrates an example of functional components that may be included in user device 220, in other implementations, user device 220 may include fewer functional components, different functional components, differently arranged functional components, or additional functional components than those depicted in FIG. 5. Additionally, or alternatively, one or more functional components of user device 220 may perform one or more tasks described as being performed by one or more other functional components of user device 220.

FIG. 6 is a flow chart of an example process 600 for providing a model to a user device 220. Process 600 may be performed by network storage system 210. In another implementation, some or all of the processing described in FIG. 6 may be performed by one or more devices separate from or in combination with network storage system 210.

Process 600 may include obtaining video recordings data for a group of user devices 220 during a time period (block 610). In one implementation, the video recordings data may include user device specific information, video recording specific information, series specific information per user device, and series specific information.

The user device specific information may, for example, include:
- the average delay between recording and playback for all video recordings associated with the user device,
- the total number of video recordings played back by the user device to date, and/or
- other types of information.

The video recording specific information may, for example, include:
- the age of each video recording,
- the number of times that the recording was watched during the time period,
- the day of the week that the video was recorded,
- the date and time at which each video was recorded,
- the date and time at which the video recording was played back,
- the total duration of the video recording,
- the date and time when the video playback was stopped,
- when the video recording is part of a television series, the name of the television series, and/or
- other types of information.

The series specific information per user device may, for example, include:

the average delay taken by the user device until previous recordings of this series were played back, the number of series episodes played to date by the user device, and/or other types of information.

The series specific information may, for example, include:

the number of episodes of this series that have aired to date, and/or other types of information.

The video recordings data may additionally, or alternatively, include other information relating to the video recordings that may aid in predicting which video recordings a particular user will watch during a given time period.

Process 600 may further include creating a model based on the obtained video recordings data (block 620). For example, network storage system 210 (e.g., transfer intelligence provisioning component 420) may use the video recordings data from the group of user devices 220 to create the model. The model may be, for example, a logistic regression model. Once created, the model may be used to estimate the probability of a particular video recording being watched, by a particular user device 220, during a particular time period. In some implementations, network storage system 210 may train (or update) the model using video recordings data for the group of user devices (or a different group of user devices 220) during a time period that is different than the time period described above with respect to block 610.

Process 600 may further include providing the model to a user device (block 630). For example, network storage system 210 (e.g., interface component 430) may provide the model to a user device 220. In one implementation, network storage system 210 may provide the model automatically in response, for example, to the model be created or updated. Network storage system 210 may also provide the model at other times. For example, network storage system 210 may provide the model in response to a request from user device 220, in response to user device 220 being powered on for the first time, etc.

FIG. 7 is a flow chart of an example process 700 for transferring/retrieving video recordings to/from network storage system 210. Process 700 may be performed by user device 220. In another implementation, some or all of the processing described in FIG. 7 may be performed by one or more devices separate from or in combination with user device 220.

Process 700 may include receiving transfer intelligence (block 1110). In one implementation, user device 220 (e.g., transfer intelligence component 520) may receive the transfer intelligence from network storage system 210. The transfer intelligence may include a model (or an algorithm) that may be used by user device 220 to estimate the probability that a user of user device 220 will watch each of the video recordings stored at user device 220 and network storage system 210.

Process 700 may further include monitoring interaction with user device 220 to obtain monitored data (block 720). For example, user device 220 (e.g., monitoring component 510) may track whether each video recording has been played back, the amount of time that each video recording has been available from user device 220 (e.g., the amount of time since the videos were recorded), the amount of time between when the video was recorded and when the video was played back, and/or other information relating to the video recordings. Additionally, or alternatively, user device 220 (e.g., monitoring component 510) may track characteristics of the television series of which a particular video recording is a part, in those situations that the particular video recording is part of a television series. For example, monitoring component 510 may track, for a particular video recording of a particular television series, the number of previous episodes, of that television series that have been recorded and played back by user device 220. Additionally, or alternatively, user device 220 (e.g., monitoring component 510) may monitor characteristics associated with the user of user device 220. For example, monitoring component 510 may monitor the user's viewing habits (e.g., does the user tend to watch recorded videos at particular times (such as during the evenings), how many recorded videos does the user tend to watch during a particular viewing period (e.g., the user tends to watch two recorded videos in the evenings), etc.).

Process 700 may also include estimating, using the transfer intelligence, a probability for each video recording, based on the monitored data (block 730). For example, user device 220 (e.g., transfer intelligence component 520) may use the monitored data and information regarding the video recordings (stored locally on user device 220 and remotely on network storage system 210) as inputs to the model to obtain an estimate of the probability that each particular video recording will be watched during a particular time period (e.g., the following day). The information regarding the video recordings may include information identifying the video recordings, stored locally on user device 220 and remotely on network storage system 210, as well as other information relating to the video recordings, such as, for example, information identifying the television series of which any of the video recordings are a part.

Process 700 may include ranking the video recordings based on the obtained probabilities (block 740). For example, user device 220 (e.g., transfer intelligence component 520) may sort a list, identifying the video recordings (stored locally on user device 220 and remotely on network storage system 210), based on the estimated probabilities, from highest to lowest. User device 220 may alternatively sort the list of video recordings in other ways.

Process 700 may include transferring/retrieving video recordings to/from network storage system 210 (block 750). For example, user device 220 (e.g., transfer intelligence component 520) may select those video recordings with the highest estimated probabilities to retain in user device 220, where the retention may involve retrieving one or more video recordings from network storage system 210. User device 220 (e.g., transfer intelligence component 520) may fill user device 210 with the video recordings, having the highest estimated probabilities of being watched, up to a particular capacity level. In some implementations, the capacity level may be less than the physical capacity of user device 220 in order to permit the user, of user device 220, to record additional videos. Additionally, or alternatively, the decision whether to transfer or retrieve a video recording may be based on comparing the video recording's estimated probability to a threshold.

User device 220 may re-perform blocks 730-750 on a periodic time interval. In one implementation, the interval may be once per day. Other time intervals may alternatively be used. In addition, user device 220 may perform blocks 730-750 at one or more particular times of the day. For example, user device 220 may perform blocks 730-750 when network usage is lowest (e.g., between 2 AM and 5 AM).

FIGS. 8A-8F provide an example 800 of the processing described above with respect to FIG. 7. In example 800 (FIG. 8A), assume that the user, of user device 220, has recorded a number of videos, including a first group of video recordings 810 which are stored on user device 220 and a second group of video recordings 820 which are stored at network storage system 210. As illustrated, first group 810 may include video recordings entitled: "FIXER UPPERS," "LAUGH OFF," "NAME THAT SONG," "NEWS SHOW," "THE BARNEY FITE SHOW," and "FOOTBALL GAME." Second group 820 may include video recordings entitled: "GAME SHOW," and "SINGING SHOW."

At a periodic time interval (e.g., daily), user device 220 (e.g., transfer intelligence component 520) may estimate the probability that each video recording in first group 810 and second group 820 will be watched during the next time interval (e.g., during the following day). Transfer intelligence component 520 may, using the model, determine the probabilities based on characteristics of the video recordings and/or characteristics of the user. For example, as illustrated in FIG. 8B, transfer intelligence component 520 may receive information identifying the video recordings, characteristics relating to the video recordings, characteristics of the user, and characteristics of the episode (when a particular video recording is part of a television series). Transfer intelligence component 520 may, based on the received information and the model, estimate a probability that each video recording, in first group 810 and second group 820, will be watched during the following day. As illustrated, transfer intelligence component 520 may generate a probability list 830 that associates the estimated probabilities with information identifying each of the video recordings. In example 800, video "FIXER UPPERS" has a probability of being watched during the following day of 80%, video "LAUGH OFF" has a probability of being watched of 90%, video "NAME THAT SONG" has a probability of being watched of 10%, video "NEWS SHOW" has a probability of being watched of 25%, video "THE BARNEY FITE SHOW" has a probability of being watched of 75%, video "FOOTBALL GAME" has a probability of being watched of 5%, video "GAME SHOW" has a probability of being watched of 45%, and video "SINGING SHOW" has a probability of being watched of 30%.

Figure 8D:
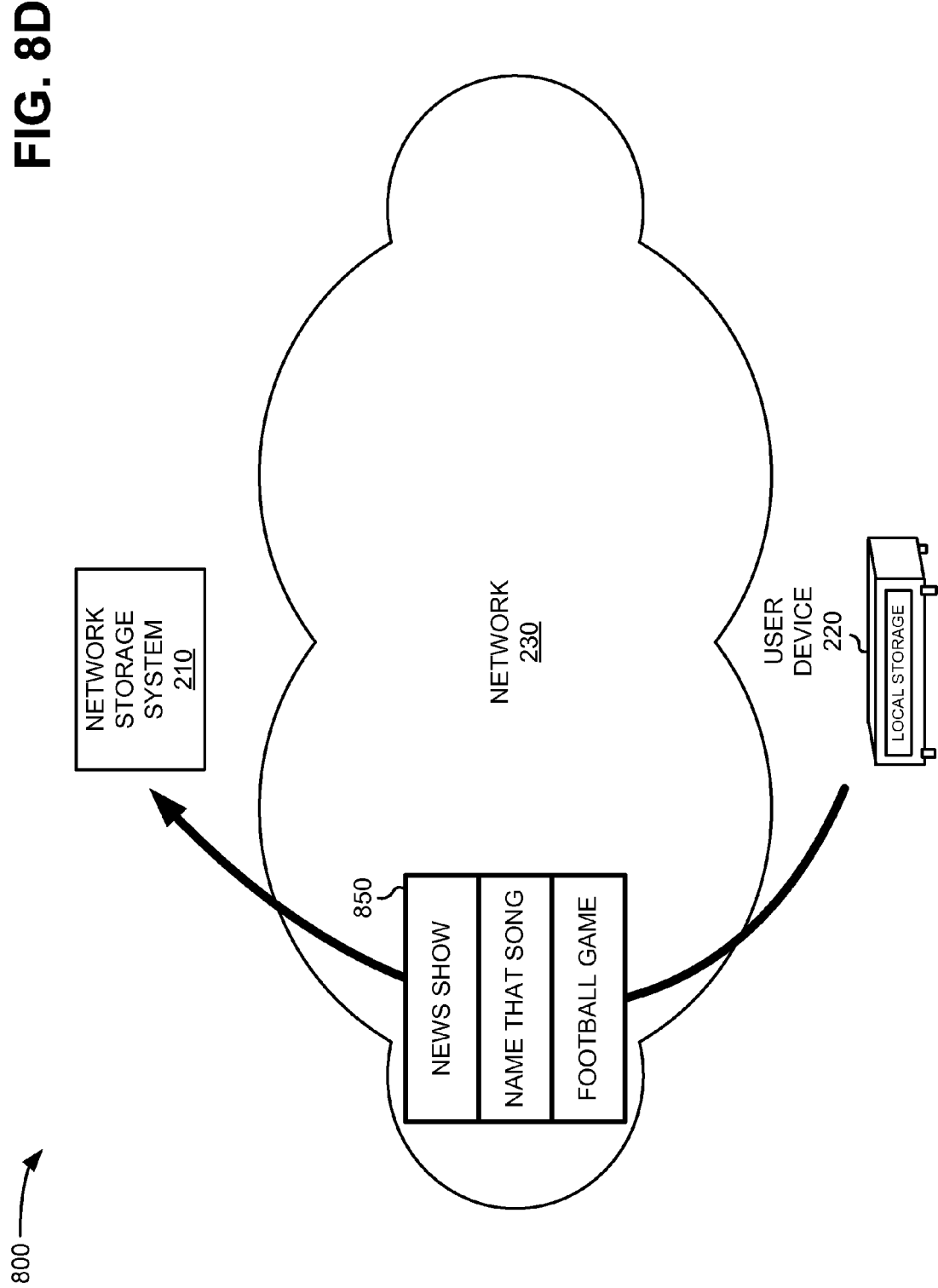
Figure 8E:
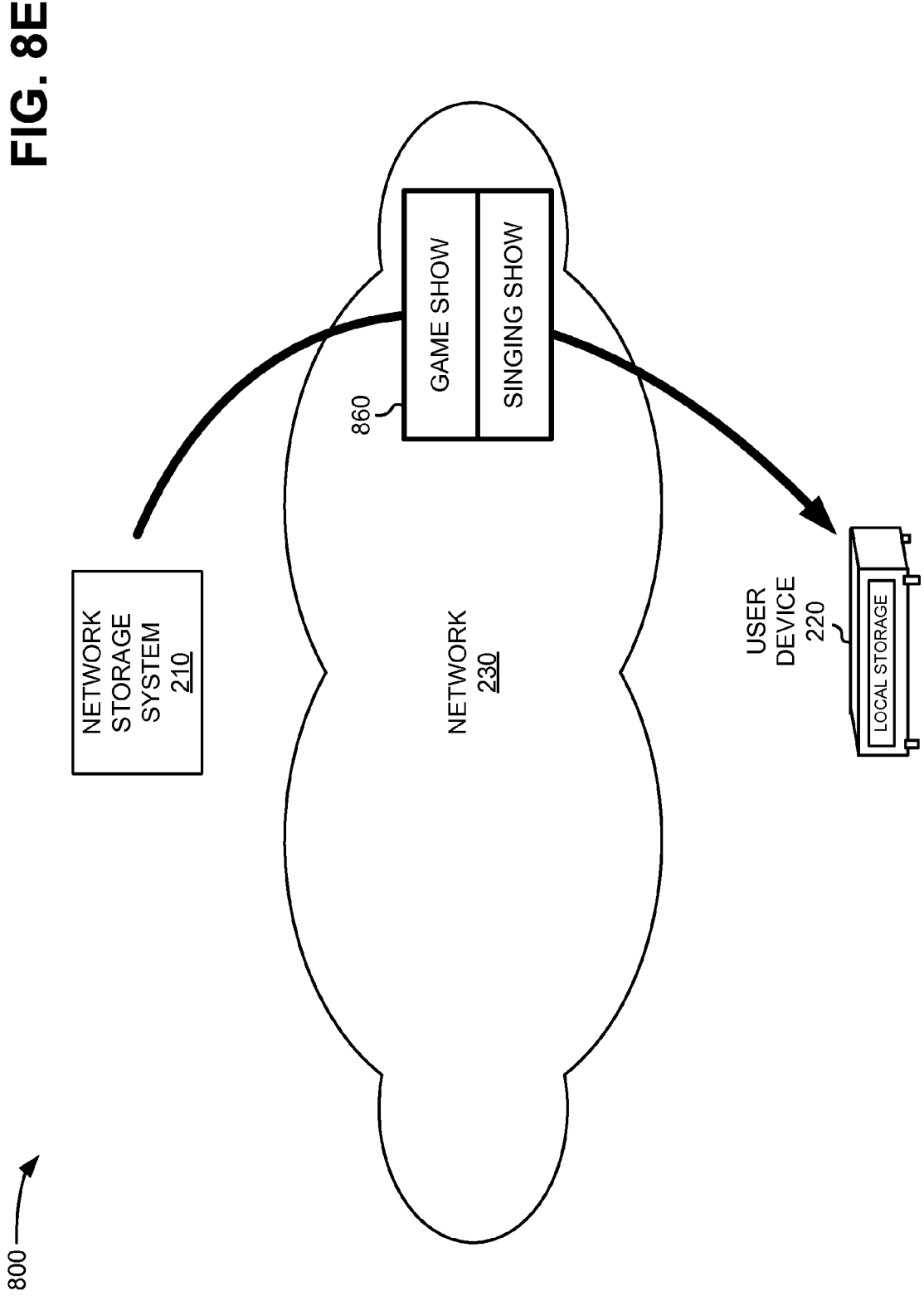

As illustrated in FIG. 8C, transfer intelligence component 520 may sort the entries in probability list 830 to create a ranked list 840. Transfer intelligence component 520 may then make transfer/retrieval decisions based on ranked list 840. For example 800, assume that transfer intelligence component 520 decides that the five highest ranking video recordings should be stored at user device 220. Thus, transfer intelligence component 520 may identify that the following video recordings are to be stored at user device 220: "LAUGH OFF," "FIXER UPPERS," "THE BARNEY FITE SHOW," "GAME SHOW," and "SINGING SHOW." Thus, as illustrated in FIG. 8D, user device 220 (e.g., transfer component 530) may transfer a group of video recordings 850 to network storage system 210. As shown, group of video recordings 850 may include the following videos from first group 810: "NEWS SHOW," "NAME THAT SONG," and "FOOTBALL GAME." User device 220 (e.g., transfer component 530) may also, as illustrated in FIG. 8E, retrieve a group of video recordings 860 from network storage system 210. As shown, group of video recordings 860 may include the following videos from second group 820: "GAME SHOW," and "SINGING SHOW."

Following the transfer of groups 850 and 860, a new first group of video recordings 870 may be stored on user device 220 and a new second group of video recordings 880 may be stored at network storage system 210. As illustrated, new first group 870 may include video recordings entitled: "FIXER UPPERS," "LAUGH OFF," "THE BARNEY FITE SHOW," "GAME SHOW," and "SINGING SHOW." New second group 880 may include video recordings entitled: "NAME THAT SONG," "NEWS SHOW," and "FOOTBALL GAME." Thus, the video recordings that have been determined to mostly likely be watched by a user, of user device 220 and during a given time period, will be retained at user device 220.

The foregoing description provides illustration and description, but is not intended to be exhaustive or to limit the invention to the precise form disclosed. Modifications and variations are possible in light of the above teachings or may be acquired from practice of the invention. For example, while the above description focused on user device 220 making decisions as to which video recordings are to be transferred and retrieved, in other implementations, some or all of the decision making may rest with network storage system 210.

In addition, while the above description focused on network storage system 210 being a remote device, implementations described herein are not so limited. For example, network storage system 210 may correspond to a local network storage system. For instance, network storage system 210 could correspond to a drive on the user's personal computer, an external memory device (such as an external hard drive or a flash drive) that physically connects to user device 220, and/or another type of memory device.

While series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device comprising:
a memory to store a plurality of video recordings; and
a processor configured to:
  estimate first probabilities that each video recording, of the plurality of video recordings, will be played back by the device during a first time period, the first prob- abilities being estimated based on one or more characteristics of a user of the device, assign a ranking to each video recording, of the plurality of video recordings, based on the estimated first probabilities, transfer one or more video recordings, of the plurality of video recordings, to a remote storage device across a network, based on the assigned rankings determined based on the estimated first probabilities, estimate second probabilities that each video recording, of the plurality of video recordings, will be played back by the device during a second time period, the second probabilities being estimated based on the one or more characteristics of the user of the device, determine that at least one of the transferred one or more video recordings will be played back by the device during the second time period based on the estimated second probabilities, the estimated second probabilities being different from the estimated first probabilities, and retrieve the at least one of the transferred one or more video recordings from the remote storage device across the network, in response to determining that the at least one of the transferred one or more video recordings will be played back by the device during the second time period.

2. The device of claim 1, wherein the processor is further configured to:

monitor an interaction of the user with the device, and obtain the one or more characteristics based on the interaction.

3. The device of claim 1, wherein the processor is further configured to:

receive a model from the remote storage device across the network; and determine the first and second probabilities using the received model.

4. The device of claim 3, where the model includes a logistic regression model.

5. The device of claim 1, wherein the first and second probabilities are further based on one or more of:

whether each video recording, of the plurality of video recordings, has been played back by the device, an amount of time since each video recording, of the plurality of video recordings, has been recorded, or an amount of time between when each video recording, of the plurality of video recordings, was recorded and when the video recording was played back.

6. The device of claim 1, wherein a particular video recording, in the plurality of video recordings, is part of a television series, and wherein the first and second probability, for the particular video recording, is further based on whether one or more other episodes of the television series have been previously recorded and played back by the device.

7. The device of claim 1, where the one or more characteristics of the user includes at least one of:

information identifying one or more particular times when the user tends to watch video recordings, or a quantity of video recordings that the user tends to watch during a viewing period.

8. The device of claim 1, wherein the processor re-performs the estimating the first and second probabilities at a periodic time interval.

9. The device of claim 1, wherein, when transferring the one or more video recordings, of the plurality of video recordings, to the remote storage device across a network, based on the assigned rankings, the processor is further configured to:

select the one or more video recordings based on a probability threshold.

10. The device of claim 1, wherein, when transferring the one or more video recordings, of the plurality of video recordings, to the remote storage device across a network, based on the assigned rankings, the processor is further configured to:

select the one or more video recordings based on a storage capacity of the device.

11. A method comprising:

estimating, by a device, first probabilities that each video recording, of a plurality of video recordings will be played back at the device during a first time interval;

assigning, by the device, a ranking to each video recording, of the plurality of video recordings, based on the estimated first probabilities;

transferring, by the device, one or more video recordings, of the plurality of video recordings, to a remote storage device via a network, based on the assigned rankings determined based on the estimated first probabilities;

estimating, by the device, second probabilities that each video recording, of the plurality of video recordings, will be played back by the device during a second time period, the second probabilities being estimated based on the one or more characteristics of the user of the device;

determining, by the device, that at least one of the transferred one or more video recordings will be played back by the device during the second time period based on the estimated second probabilities, the estimated second probabilities being different from the estimated first probabilities; and retrieving, by the device, the at least one of the transferred one or more video recordings from the remote storage device via the network, in response to determining that the at least one of the transferred one or more video recordings will be played back by the device during the second time period.

12. The method of claim 11, wherein estimating the first and second probabilities includes:

receiving the model from the remote storage device across the network; and using a model to estimate the first and second probabilities.

13. The method of claim 12, where the model includes a logistic regression model.

14. The method of claim 12, wherein the model is based on at least one of:

an average delay, for each first user device in a group of first user devices, between recording and playback of video recordings, or a total quantity of video recordings played back by each first user device, of the group of first user devices.

15. The method of claim 12, wherein the model is based on at least one of:

an age of each video recording stored on a group of first user devices, a quantity of times that each video recording was watched during a time period, a date and time at which each video recording was recorded, a date and time at which each video recording was played back, a total duration of each video recording, a date and time when each video recording playback was stopped, or a name of a television series, for each video recording, when the video recording is part of a television series.

16. The method of claim 12, wherein the model is based on television series specific information on a per user device basis, and wherein the television series specific information on the per device basis includes at least one of:
- an average delay taken, by a first user device of a group of first user devices, until previous video recordings of the television series were played back, or
- a number of series episodes played to date by the first user device.

17. The method of claim 12, wherein the model is based on information identifying a number of episodes of a television series that has aired to date.

18. The method of claim 11, wherein transferring of the plurality of video recordings, to a remote storage device via a network includes:
- selecting the one or more video recordings based on a probability threshold.

19. The method of claim 11, wherein transferring of the plurality of video recordings, to a remote storage device via a network includes:
- selecting the one or more video recordings based on a storage capacity of the device.

* * * * *